(12) United States Patent
Welicki et al.

(10) Patent No.: US 9,575,732 B2
(45) Date of Patent: Feb. 21, 2017

(54) PROVIDING DESIGN TIME PROJECTIONS FOR A VISUAL PROGRAM

(71) Applicant: Microsoft Technology Licensing LLC, Redmond, WA (US)

(72) Inventors: Leon Ezequiel Welicki, Issaquah, WA (US); Balasubramanian Shyamsundar, Redmond, WA (US); Kenneth David Wolf, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 13/919,224

(22) Filed: Jun. 17, 2013

(65) Prior Publication Data

US 2014/0372974 A1 Dec. 18, 2014

(51) Int. Cl.
*G06F 9/44* (2006.01)
*G06F 9/45* (2006.01)

(52) U.S. Cl.
CPC . *G06F 8/34* (2013.01); *G06F 8/31* (2013.01); *G06F 8/311* (2013.01); *G06F 8/433* (2013.01)

(58) Field of Classification Search
CPC .... G06F 8/20–8/34; G06F 8/311; G06F 8/433
See application file for complete search history.

(56) References Cited

U.S. PATENT DOCUMENTS

| | | | |
|---|---|---|---|
| 6,757,887 B1 * | 6/2004 | Kaplan et al. | 717/106 |
| 7,509,655 B2 | 3/2009 | Willis et al. | |
| 8,341,598 B2 | 12/2012 | Peck et al. | |
| 8,397,211 B2 | 3/2013 | Ionfrida et al. | |
| 8,527,327 B1 * | 9/2013 | Lawrence | 705/7.38 |
| 2005/0102127 A1 * | 5/2005 | Crowe et al. | 703/22 |
| 2006/0074734 A1 * | 4/2006 | Shukla | G06F 8/10 717/107 |

(Continued)

OTHER PUBLICATIONS

Ma Hua, VLab-CC: A Generic Framework of Virtual Laboratory Based on Component Composition, 2009, pp. 1-4.*

(Continued)

*Primary Examiner* — Thuy Dao
*Assistant Examiner* — Mongbao Nguyen
(74) *Attorney, Agent, or Firm* — Kevin Sullivan; Kate Drakos; Micky Minhas

(57) ABSTRACT

Embodiments are directed to presenting multiple projections of a declarative program and to presenting partial projections of a declarative program. In one scenario, a computer system establishes a declarative program that includes various artifacts. The computer system displays a first projection of the declarative program, which includes one or more elements of a workflow. The computer system then determines that an additional projection is to be displayed in addition to the first projection, and presents a second projection based on the artifacts of the declarative program. The second projection illustrates the artifacts in a form different than that shown in the first projection, and is presented in addition to the first projection. In some cases, the computer system further receives an input and edits the declarative program according to the received input. The edits to the declarative program are substantially lossless, and can be performed using partial or full projections.

20 Claims, 9 Drawing Sheets

(56) References Cited

U.S. PATENT DOCUMENTS

| | | | |
|---|---|---|---|
| 2007/0245300 A1* | 10/2007 | Chan | G06Q 10/06 717/105 |
| 2007/0266368 A1* | 11/2007 | Szpak | G06F 8/10 717/105 |
| 2008/0235756 A1* | 9/2008 | Cohen et al. | 726/1 |
| 2008/0244594 A1* | 10/2008 | Chen | G06F 8/34 718/104 |
| 2008/0301641 A1* | 12/2008 | Bojjireddy et al. | 717/121 |
| 2009/0113379 A1* | 4/2009 | Sedukhin | G06F 8/35 717/104 |
| 2009/0199113 A1* | 8/2009 | McWhinnie et al. | 715/762 |
| 2010/0169862 A1* | 7/2010 | Wolf | G06F 8/313 717/117 |
| 2010/0274942 A1* | 10/2010 | Grgic et al. | 710/306 |
| 2010/0281462 A1* | 11/2010 | Festa | G06Q 10/06 717/108 |
| 2010/0299300 A1* | 11/2010 | Wolf et al. | 706/46 |
| 2011/0016448 A1* | 1/2011 | Bauder | G06F 8/20 717/104 |
| 2011/0154302 A1* | 6/2011 | Balko et al. | 717/140 |
| 2011/0184870 A1* | 7/2011 | Angel | G06F 8/34 705/301 |
| 2011/0185315 A1* | 7/2011 | Armour | G06F 8/34 715/853 |
| 2011/0276915 A1 | 11/2011 | Freire et al. | |
| 2011/0289515 A1* | 11/2011 | Hung | G06F 8/34 719/318 |
| 2011/0302555 A1* | 12/2011 | Balasubramanian | G06F 8/34 717/113 |
| 2012/0159423 A1* | 6/2012 | Becker et al. | 717/102 |
| 2012/0221998 A1* | 8/2012 | Rowley | G06F 9/4443 717/105 |
| 2012/0254825 A1* | 10/2012 | Sharma | G06F 8/34 717/101 |
| 2012/0317543 A1* | 12/2012 | Baudel | G06F 8/34 717/105 |
| 2013/0073994 A1 | 3/2013 | Liao et al. | |
| 2013/0104107 A1 | 4/2013 | De Smet et al. | |
| 2013/0152041 A1* | 6/2013 | Hatfield | G06Q 10/06 717/105 |
| 2013/0185694 A1* | 7/2013 | Taylor | G06F 9/5038 717/104 |
| 2013/0226816 A1* | 8/2013 | Chory et al. | 705/301 |
| 2013/0239089 A1* | 9/2013 | Eksten | G06F 8/70 717/120 |
| 2013/0239090 A1* | 9/2013 | Hamlin | G06F 8/34 717/123 |
| 2014/0032606 A1* | 1/2014 | Chandler | G06F 8/34 707/798 |
| 2014/0096041 A1* | 4/2014 | Gowen | G06F 3/0484 715/753 |
| 2014/0173448 A1* | 6/2014 | Aly et al. | 715/738 |

OTHER PUBLICATIONS

Dirk Fahland, Declarative versus Imperative Process Modeling Languages: The Issue of Maintainability, 2009, pp. 1-12.*

Paul Groth, Analyzing the Gap Between Workflows are their Descriptions, 2009, pp. 1-8.*

LOGICCHILD, "Microsoft Windows Workflow Foundation", Published on: Aug. 31, 2009, Available at: http://www.codeproject.com/Articles/37285/Microsoft-Windows-Workflow-Foundation.

Milner, Matt, "A Developer's Introduction to Windows Workflow Foundation (WF) in .Net 4", Published on: Nov. 2009, Available at: http://msdn.microsoft.com/en-us/library/ee342461.aspx.

* cited by examiner

GET http://foo/customers and Store response in customers

For each customer in customers

In Parallel

Send an email to Customer.Name (cc, bcc, subject, body)

AND

POST customer.Id to http://contoso/customers/foo

Textual View *601*

*Figure 6*

HttpSend
▶ ForEach
  ▶ Parallel
    SendMail
    HttpSend

Tree View *701*

*Figure 7*

PROVIDING DESIGN TIME PROJECTIONS FOR A VISUAL PROGRAM

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email. In some cases, software applications may allow non-technical users to author declarative programs using a graphical interface. The non-technical users can use the graphical interface to combine existing software portions (i.e. artifacts) to create new software functionality.

BRIEF SUMMARY

Embodiments described herein are directed to presenting multiple projections of a declarative program and to presenting partial projections of a declarative program. In one embodiment, a computer system establishes a declarative program that includes various artifacts. The computer system displays a first projection of the declarative program, which includes one or more elements of a workflow. The computer system (or, in some cases, a user) then determines that an additional projection is to be displayed in addition to the first projection, and presents a second projection based on the artifacts of the declarative program. The second projection illustrates the artifacts in a form different than that shown in the first projection, and is presented in addition to the first projection.

In another embodiment, a computer system establishes a declarative program that includes artifacts. The computer system identifies at least one form of the declarative program that is to be presented in a partial projection, and displays the partial projection presentation in addition to the artifacts of the declarative program. Optionally, the computer system further receives an input from a user indicating that some of the artifacts being displayed in the partial projection are to be edited. The computer system then edits the declarative program based on the received input. The edits performed to the declarative program through the partial projection are substantially lossless and, as such, no data is lost when artifacts are edited in the partial projection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 6 illustrates an embodiment of a textual projection of a declarative program.

FIG. 7 illustrates an embodiment of an example partial projection of a declarative program

DETAILED DESCRIPTION

Figure 1:
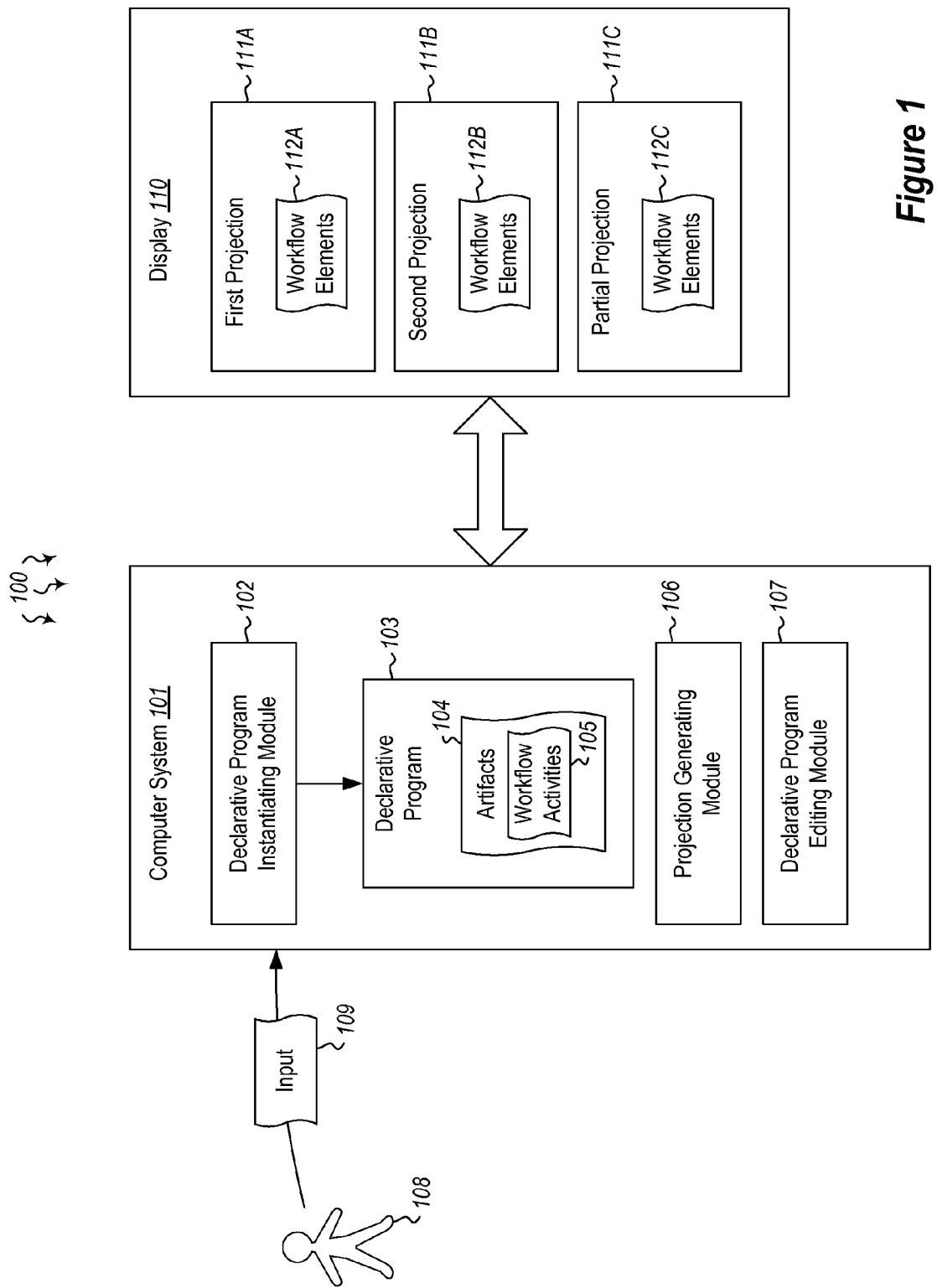
FIG. 1 illustrates a computer architecture in which embodiments described herein may operate including presenting multiple projections of a declarative program.

Embodiments described herein are directed to presenting multiple projections of a declarative program and to presenting partial projections of a declarative program. In one embodiment, a computer system establishes a declarative program that includes various artifacts. The computer system displays a first projection of the declarative program, which includes one or more elements of a workflow. The computer system (or, in some cases, a user) then determines that an additional projection is to be displayed in addition to the first projection, and presents a second projection based on the artifacts of the declarative program. The second projection illustrates the artifacts in a form different than that shown in the first projection, and is presented in addition to the first projection. Optionally, the computer system further receives an input from a user indicating that some of the artifacts being displayed in either the first or the second projection are to be edited. The computer system then edits the declarative program based on the received input. The edits performed to the declarative program through the first or second projection are substantially lossless and, as such, no data is lost when artifacts are edited in the projection(s).

In another embodiment, a computer system establishes a declarative program that includes artifacts. The computer system identifies at least one form of the declarative program that is to be presented in a partial projection, and displays the partial projection presentation in addition to the artifacts of the declarative program. Optionally, the computer system further receives an input from a user indicating that some of the artifacts being displayed in the partial projection are to be edited. The computer system then edits the declarative program based on the received input. The edits performed to the declarative program through the partial projection are substantially lossless and, as such, no data is lost when artifacts are edited in the partial projection.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes modules for performing a variety of different functions. For instance, the declarative program instantiating module 102 may instantiate a declarative program 103. As used herein, a "declarative program" generally refers to a software program that is created by describing what the program should accomplish, rather than describing how the program is to accomplishing it (the how is typically left up to the programming language's implementation). The declarative program 103 may have many different programming constructs, or "artifacts" 104. These artifacts may include workflow activities 105, each workflow activity having pulses of work that are to be accomplished as part of the declarative program 103.

During development of the declarative program 103 (or when making subsequent modifications thereto), various workflow elements may be displayed in a projection. For instance, workflow elements 112A may be shown in the first projection 111A of display 110. These projections may be generated by the declarative program itself, or by a separate functionality module referred to herein as a projection generating module 106. Examples of projections are provided below, as well as in the drawings.

It should be generally understood that a continuation-based runtime enables running long-running durable programs authored declaratively (e.g. declarative program 103). Declarative program developers or other users are often provided with visual authoring tools that allow the users to author processes using a graphical user interface (UI) that represents the program or process in a bi-dimensional canvas. In some cases, the declarative program 103 may be represented as a directed graph, which allows users to describe the flow of tasks and information of the program's processes. Some users may be interested in different level of details and abstractions (i.e. more or fewer details). As such, some tasks may implement only a partial visualization of the graph (e.g. partial projection 111C). Embodiments described herein provide appropriate representations of the declarative program 103 authored for a continuation-based runtime in the most effective way to the user based on the task that the user (e.g. 108) is trying to accomplish, and further allow the user to choose what that representation is.

As mentioned above, the declarative program may include artifacts 104, some of which may include workflow activities 105. A continuation-based runtime executes activities. An "activity" represents a unit of executable code that includes multiple pulses of work. Users of the continuation-based runtime may be provided with a library of activities that they can use to write their programs. User 108, for example, can create their own activities by implementing existing activities, or developing new ones.

Figure 8:
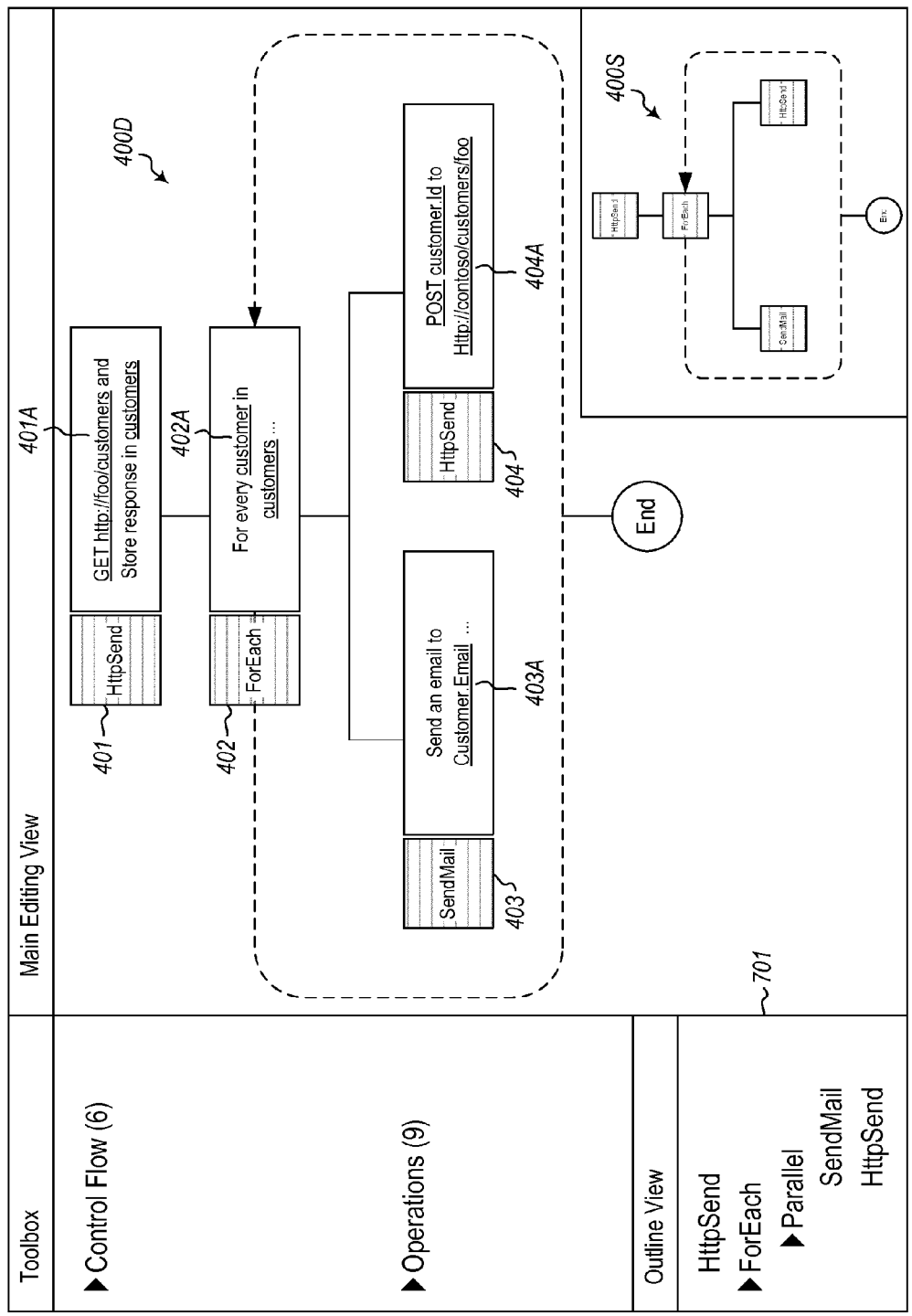
FIG. 8 illustrates an embodiment in which multiple projections are presented simultaneously.

At least in some embodiments, non-developer users are provided with a visual experience for authoring declarative programs. Using this visual experience, a non-developer user can combine existing artifacts to create new ones. The visual experience may include one or more visual representations or "projections" that enable general program definitions which can be applied to multiple problems in a given domain. In one example, a corporate expense approval process is described (see FIG. 4). The overall process can be represented visually as a flowchart, but the details of each stage in the flowchart (i.e. each process step) may be better described textually. Both the overall representation and the detailed view, though, are part of the same artifact: the declarative program being authored. The different projections (e.g. 111A and 111B) are designed to provide an appropriate (or an optimal) representation for the task at hand. Multiple projections can be used concurrently (as they project different aspects of the same artifact), as can be seen in FIG. 8.

Embodiments described herein thus provide different views over a declarative program. The views (i.e. projections) may be partial (indicating that they focus on a region of the program) or full (indicating that they encompass the full program). The projections may be diagrams, text representations, outline representations (e.g. tree view), lists of activities that posses a certain characteristics (e.g. for data binding), and others. Embodiments further determine the proper and optimal projection for the specific user (e.g. 108). It should be noted that the above examples of projections are only a few among many different types of possible projections. Indeed, in some embodiments, tool authors or other users may be able to create customized projections for their own specific implementations.

Figure 4:
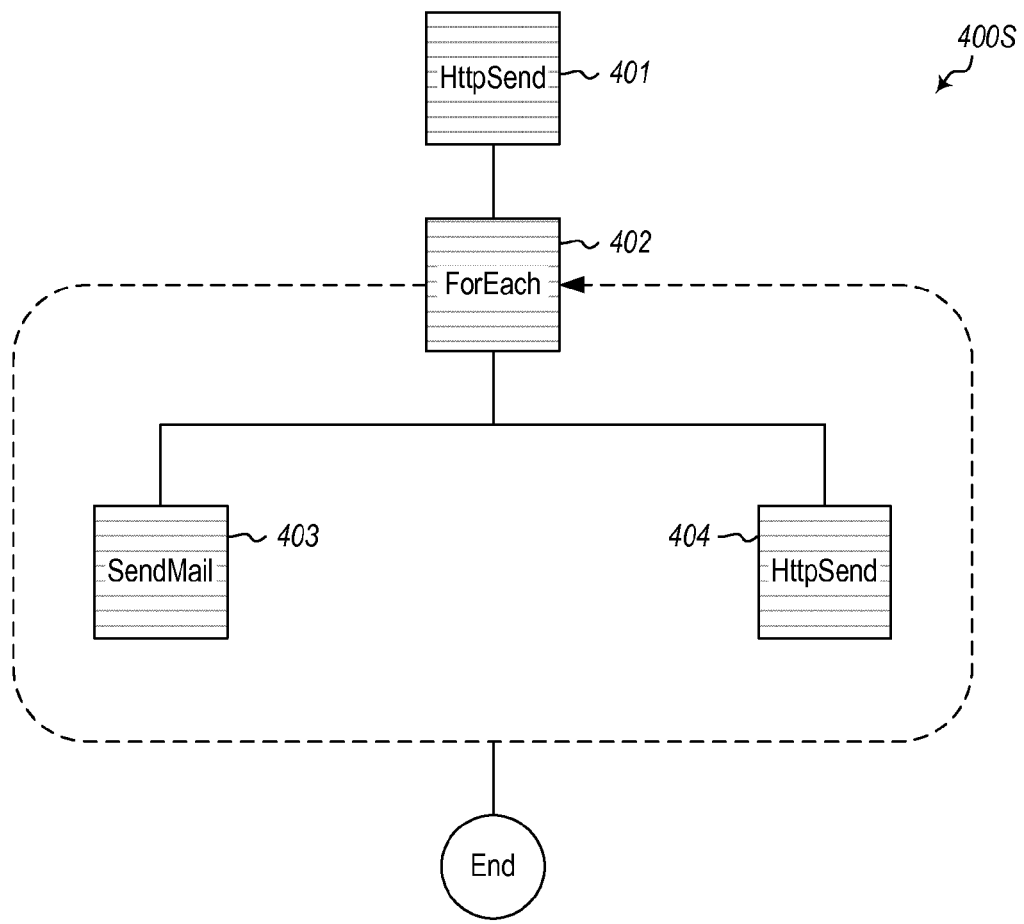
FIG. 4 illustrates an embodiment of a flowchart projection of a declarative program.

Examples of projections may be seen in FIGS. 4-10. These figures cover various example embodiments. For instance, FIG. 4 shows a flowchart of a declarative program that performs the following: the program retrieves a set of customers from a service (via an HTTP message 401). For each customer (402), send an email (403), and post (404) the ID of the customer to another service. FIG. 4 thus shows a projection of that declarative program as a graph in a "flowchart" or "boxes and arrows" fashion (400S).

Figure 5:
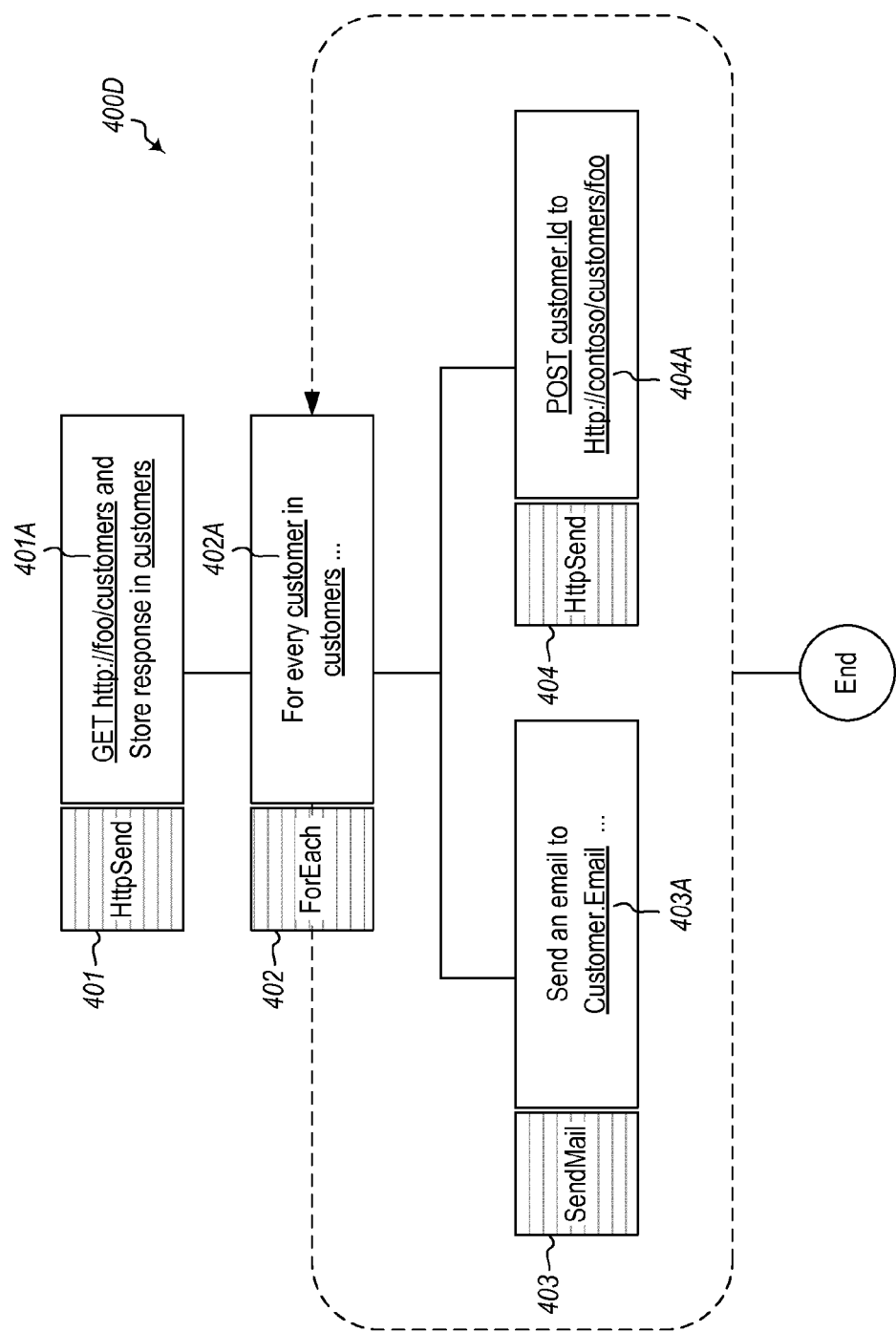
FIG. 5 illustrates an embodiment of a flowchart projection of a declarative program that includes information automatically generated based on the configuration of each activity.

FIG. 5 shows a projection that augments the diagram in FIG. 4 by computing sentences (e.g. 401A-404A) based on metadata and configuration of each of the boxes. As such, the diagram (400D) includes additional details left out of the more simplified version (400S of FIG. 4). Because the generated sentences are based on metadata and configuration data, the more detailed data flow is said to be "self-documenting". FIG. 6 illustrates a textual representation 601 of the declarative program with the computed sentences shown in FIG. 5). These are the same (or substantially the same) sentences generated for FIG. 5. FIG. 7 shows a tree view 701 that provides a succinct outline of the declarative program. The user can use this projection to step through the declarative program in a tree-view fashion. As the same artifact is being accessed to supply the data used in the projection, each projection will show the same (or substantially the same) data, but in a different form. Still further, as mentioned above, multiple different projections can be used together concurrently. FIG. 8 shows the tree view projection 701, the more detailed flow diagram 400D, and the simplified diagram 400S. These figures will be described further below.

Figure 9:
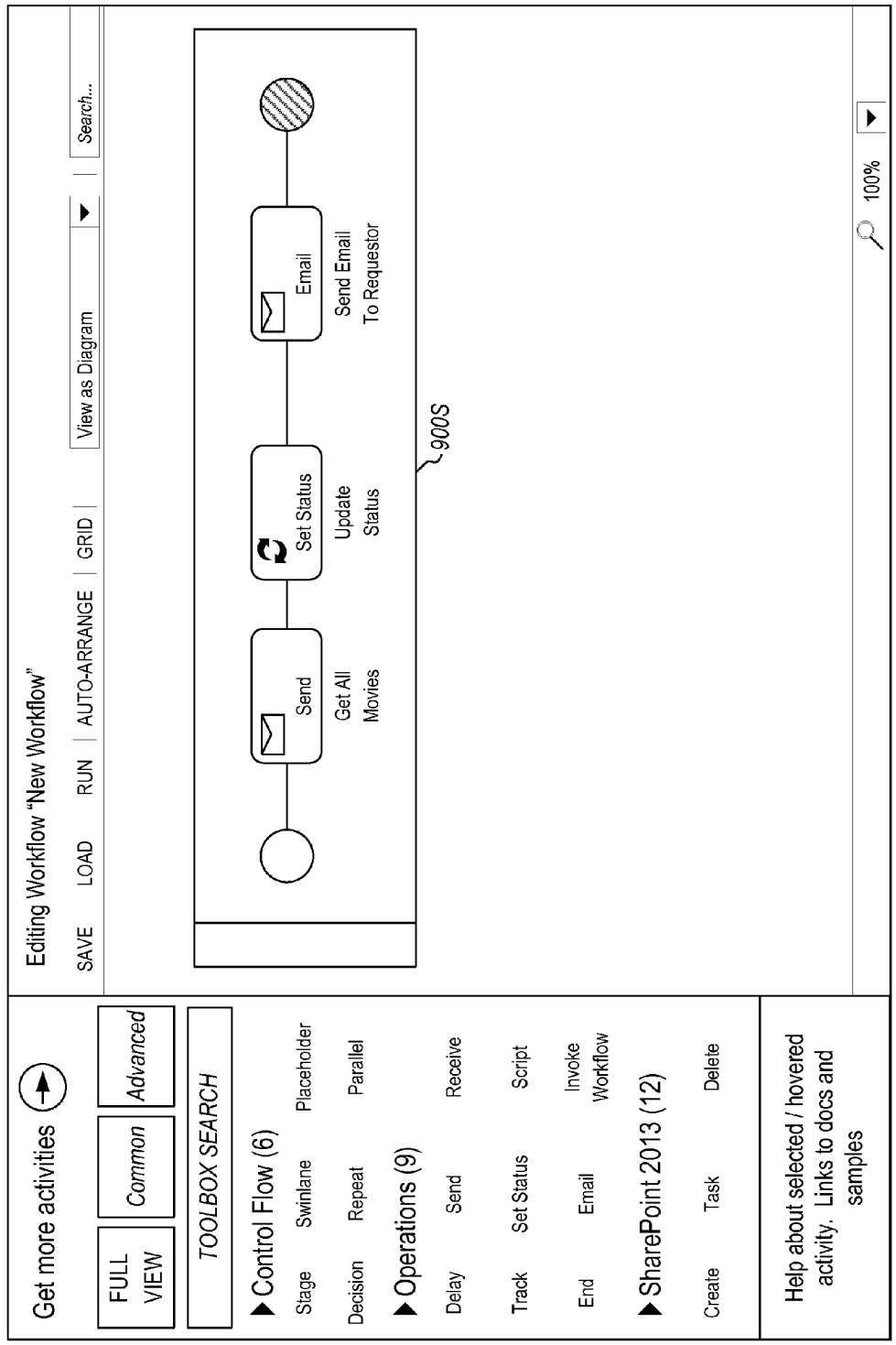
FIG. 9 illustrates an embodiment of a simplified workflow projection of a declarative program.
Figure 10:
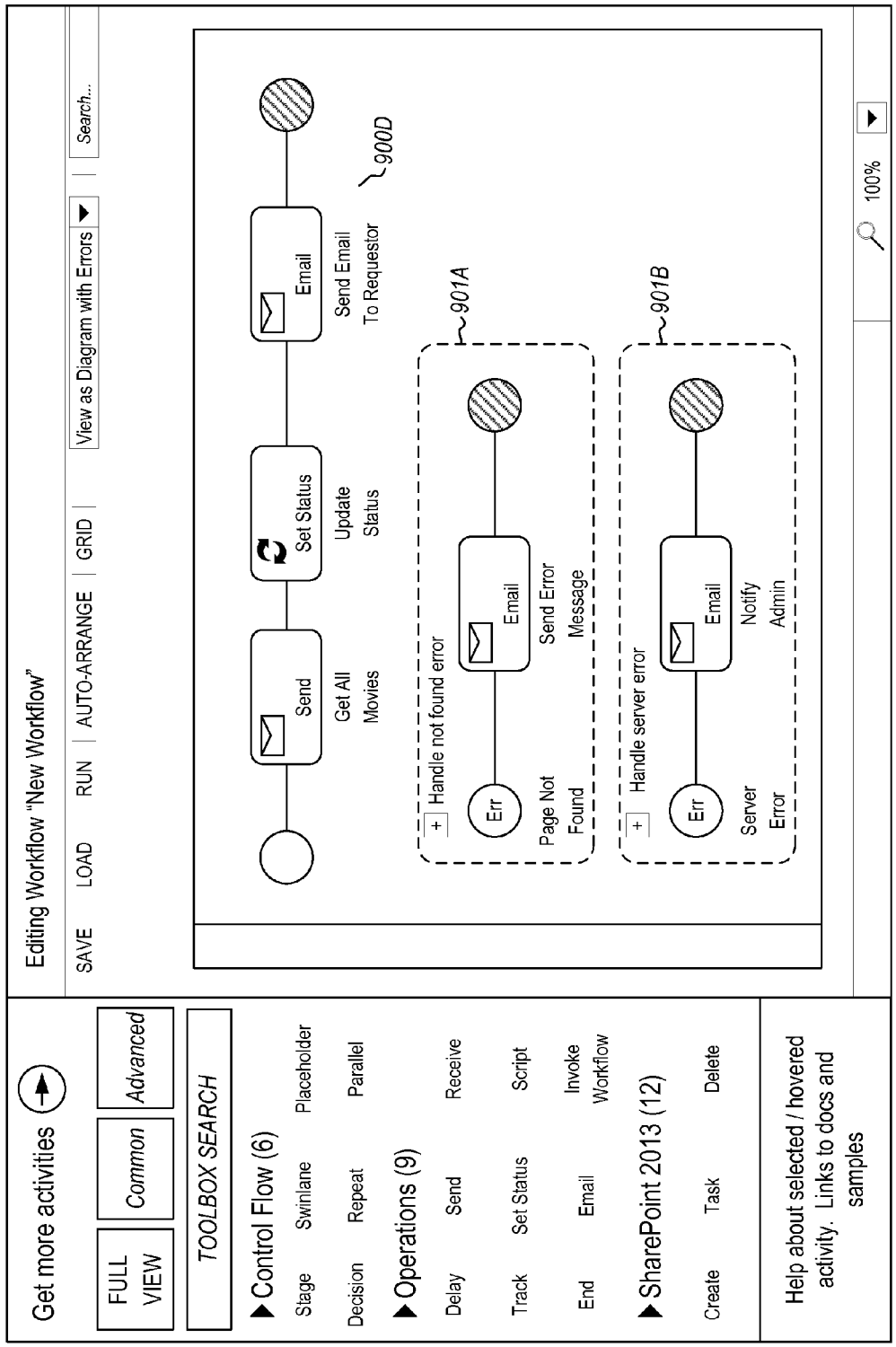
FIG. 10 illustrates an embodiment of a more detailed workflow projection of a declarative program.

Thus, different projections may be provided at varying levels of granularity. In some cases, a partial projection may be used to complement a full projection (as shown in FIG. 8). This allows analysts or other users to have a simplified (or, at least, less detailed) view, and developers can have a more detailed view. These views may be added or removed dynamically, as requested by the user (108). As shown in FIG. 9, a more simplified view 900S may be provided for those users that do not wish to see error conditions. The simplified projection 900s provides general process description, and leaves out error handling details. In FIG. 10, a more detailed projection 900D is shown that includes error handling overlays 901A and 901B. The simplified projection can help a business (or other non-technical) user to have a clear understanding of the process without the additional detail of how to deal with errors (which are often at a lower level of abstraction). The developer (or other technical user) can later add those details without cluttering the overview description of the process. The overlays can be toggled on and off, as desired by the developer or other user. It should be noted here that error conditions are merely one example of additional detailed information that could be shown in a projection, and that substantially any type of information may be shown in the overlays.

The projections can also be implemented in a variety of ways. For instance, each activity's design time definition may include a pointer to a set of "renderers" that know how to render the activity in each projection. In some cases, there can be a default renderer that is responsible to provide a reasonable default experience that can be overridden by the activity author. At least in some cases, each registered projection is responsible of providing such a default experience. As a result, each of the elements in the graph has a reasonable default visualization experience. This experience can be dynamically linked, providing the ability of changing it and/or evolving it over time, adding new experiences through new projections. These concepts will be explained further below with regard to methods 200 and 300 of FIGS. 2 and 3, respectively.

Figure 2:
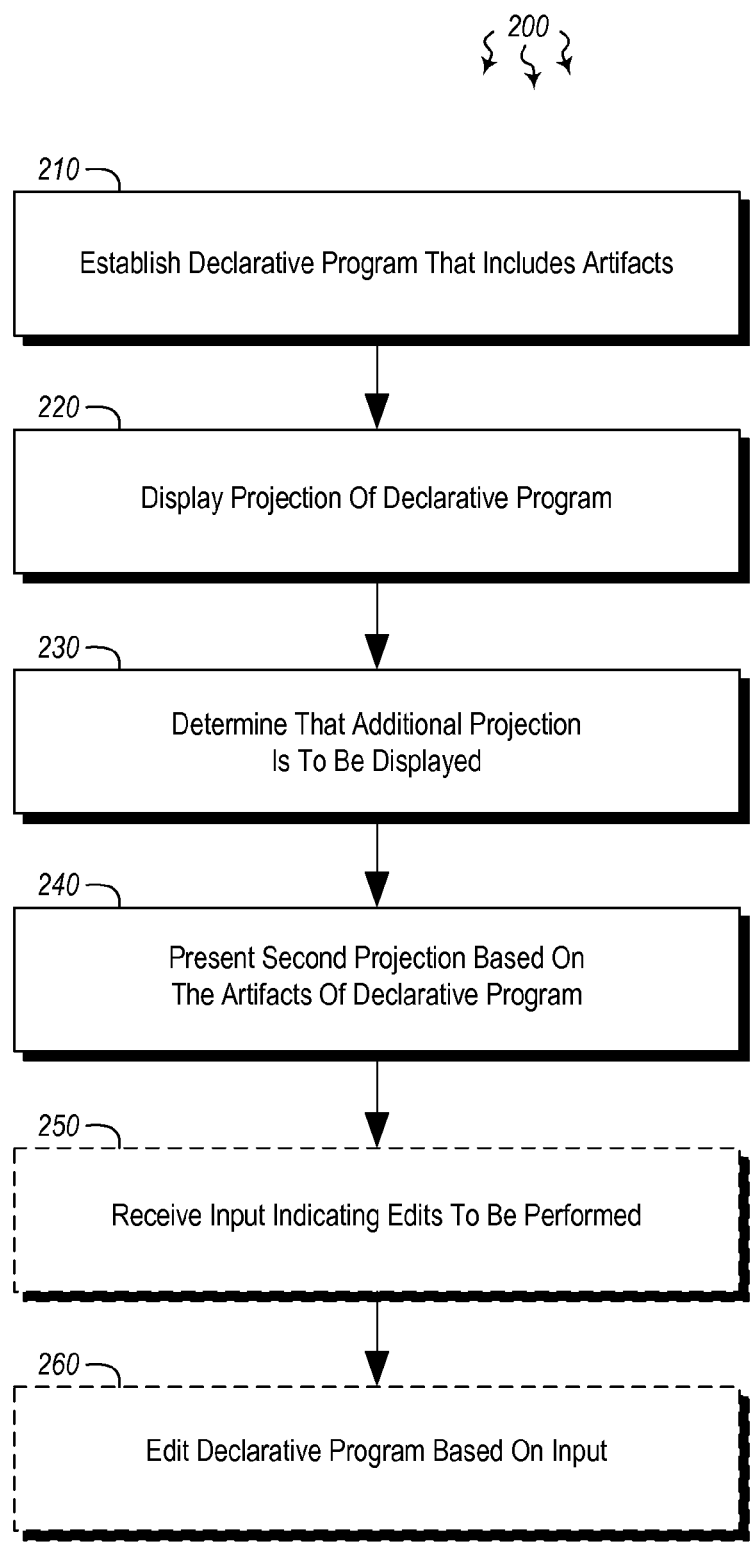
FIG. 2 illustrates a flowchart of an example method for presenting multiple projections of a declarative program.
Figure 3:
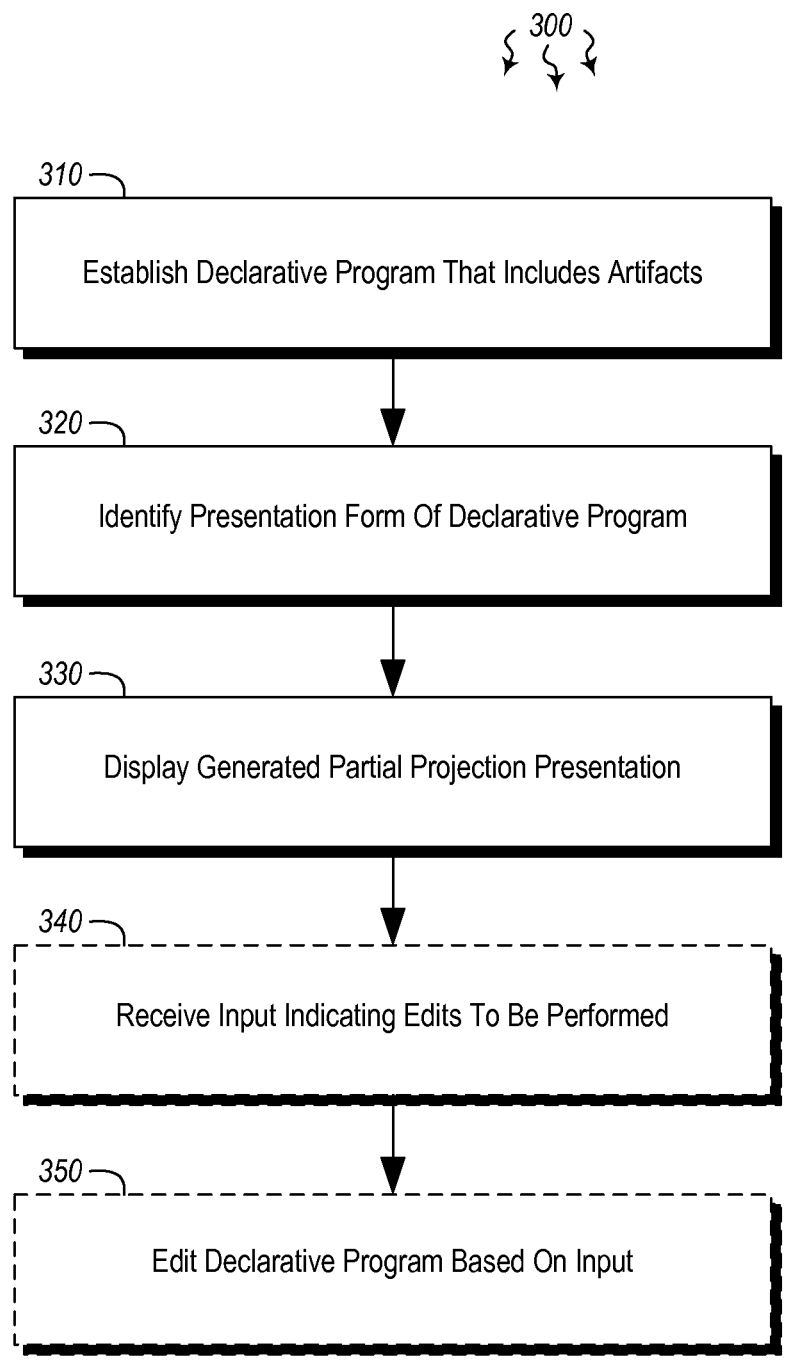
FIG. 3 illustrates a flowchart of an example method for presenting partial projections of a declarative program.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for presenting multiple projections of a declarative program. The method 200 will now be described with frequent reference to the components and data of environment 100.

Method 200 includes an act of establishing a declarative program that includes one or more artifacts (act 210). For example, declarative program instantiating module 102 of computer system 101 may instantiate declarative program 103. The declarative program may include artifacts 104 such as workflow activities. Each of the workflow activities may include one or more pulses of work 105 that are to be performed as part of the declarative program 103. The workflow may represent a business activity, a process, a method or some other series of steps that are to be taken to accomplish a designed goal. The workflow may be part of a declarative program that is executable in a continuation-based runtime. The declarative program itself 102 may be a long-running program or any other type of program.

Method 200 next includes an act of displaying a first projection of the declarative program, the first projection including one or more elements of a workflow (act 220). For example, first projection 111A may be displayed on display 110. The display 110 may be any type of monitor, screen, television or other type of device that can display digital or analog data. The first projection may include workflow elements, as shown in FIG. 4. For instance, the simplified flow chart 400S includes various workflow elements (401-404) that perform a specific task. In the example shown in FIG. 4, the workflow elements retrieve a set of customers from a service (via an HTTP message 401). For each customer (402), the declarative program (i.e. the workflow) sends an email (403), and posts (404) the ID of the customer to another service.

The computer system 101 may then determine that at least one additional projection is to be displayed in addition to the first projection (act 230). The computer system 101 may present (e.g. in display 110) a second projection 111B (and its corresponding elements 112B) based on the one or more artifacts of the declarative program 102, where the second projection illustrates the artifacts in a form different than that shown in the first projection, where the second projection is presented in addition to the first projection (act 240). Thus, as shown in FIG. 8, a simplified projection 400S may be displayed in addition to the detailed workflow projection 400D and the tree view 701. Other views or projections may also be displayed in display 110. Each projection may be an overlay that can be added or removed at any time. In some cases, the user 108 (using input 109) can designate which projections (e.g. 111A-111C) are to be displayed at any given time.

In some embodiments, the computer system 101 may determine user 108's declarative program objectives, and may define the second (or third, or subsequent) projection 111B in accordance with the computer system user's determined objectives. As such, the view or views shown to the user may be tailored based on the objectives of the declarative program, or based on contextual data. For instance, if the user consistently wants to see a simplified view, the simplified projection 400S may be shown first. On the other hand, if the user 108 continually requests full or partial projections that include increased levels of detail, those projections will be shown first, with the user having the option to remove, replace or add new projections at any time. In some cases, the declarative program 102 generates these projections, and in other cases, the projections may be generated by another portion of functionality encapsulated as projection generating module 106. These projections may be generated dynamically, and may be used to show a declarative program in a variety of forms. Each projection may not only show the declarative program 102 in a variety of forms, it may provide a variety of different user experiences for the same declarative program artifact.

While the various projections are being displayed in display 110, a user (108) may indicate (using input 109) that they wish to switch from one projection to another projection. For instance, the user may wish to switch from the first projection 111A with its corresponding workflow elements 112A, to partial projection 111C and its corresponding workflow elements 112C. In this case, the partial projection 111C may be displayed next to or on top of the first projection 111A. If the user were switching from the first projection 111A to the second projection 111B, because the second projection is a full projection, it would (at least substantially) cover the first projection. The user can thus move from one projection to another (e.g. from text to picture). There is (at least substantially) no loss in data, as each projection is generated from the same artifacts.

If a user accesses declarative program data through a given projection (e.g. second projection 111B) and changes any portion of that data, other presentation images in the other projections are automatically updated with data from the one or more artifacts. Thus, for example, if a user updated data in a tree view (e.g. 701), the updated data would be shown in corresponding workflow views 400S/400D or other views. In some cases, the data presented in the projections is read only and, as such, users are not allowed to change the data.

In other cases, users can edit the underlying data from within any of the projections. For example, as indicated in optional acts 250 and 260, user 108 may send an input indicating that some of the artifacts being displayed in the first projection 111A and/or in the second projection 111B are to be edited. The declarative program editing module 107 of computer system 1010 may then edit the declarative program 103 based on the received input 109. The edits performed to the declarative program through the first and/or second projection are substantially lossless and, as such, no data is lost when artifacts are edited in the first, second or other projections. Data editing and showing projections in partial form will be described further below with regard to FIG. 3.

FIG. 3 illustrates a flowchart of a method 300 for presenting partial projections of a declarative program. The method 300 will now be described with frequent reference to the components and data of environment 100.

Method 300 includes an act of establishing a declarative program that includes one or more artifacts (act 310). Thus, declarative program 103 may be established using the declarative program instantiating module 102. The computer system 101 may then identify at least one form of the declarative program that is to be presented in a partial projection (act 320). For example, the form may be a tree form, a picture form, a picture+description form, a workflow form or other type of form. The determined form may be presented as partial projection 111C (e.g. tree view 701). The partial projection presentation may then be displayed in addition to the one or more artifacts of the declarative program (act 330). In some cases, the partial projection is provided by a third party. For instance, customers or other users may be able to repackage existing projections or design their own. Again, because the third party projections would be built on the same declarative program, updates made using one projection would be updated on other projections in a predictable manner.

Partial projection presentations (111C) may further be configured to show data binding terminals that are currently available in the partial projection presentation. These may be used, for instance, to show a list of activities that possess certain characteristics to which data can be bound, among other things. Still further, partial projection may include (or may themselves be) an event-driven overlay. In such cases, the user 108 can decide whether to show the overlays. These overlays may be used for monitoring, troubleshooting, auditing or performing other tasks related to the declarative program 102.

Method 300 further includes an optional act of receiving an input indicating that one or more of the artifacts being displayed in the partial projection are to be edited (act 340). For instance, computer system 101 may receive input 109 from user 108 indicating that one or more elements or artifacts 104 are to be edited (i.e. changed or updated). Method 300 next includes an optional act of editing the declarative program based on the received input (act 350). In this manner, the edits received from the user may be applied to the declarative program, and may be spread to the other projections.

In some embodiments, changes to the declarative program may be dynamically changed in the other projections, regardless of which projection is used to enter the edits. The edits performed to the declarative program 102 through the full projections or through the partial projection are substantially lossless—that is, data is not lost when artifacts are edited in the partial or the full projections. The changes are propagated to other projections (at least in some cases) substantially instantaneously. In this manner, users can view and edit declarative programs, regardless of their level of technicality. Projections will be displayed according to the level of granularity desired by the user.

Accordingly, methods, systems and computer program products are provided which present multiple projections of a declarative program. Moreover, methods, systems and computer program products are provided which present partial projections of a declarative program, and which propagate edits received at a projection to other projections shown on the display.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented by a computer system that includes one or more processors, for presenting multiple projections of a declarative program, the method comprising:

establishing a declarative program that includes one or more artifacts comprising one or more program constructs;

visually presenting a first projection of the declarative program within an interface display, the first projection illustrating the one or more artifacts and including a first set of one or more elements of a workflow corresponding to the one or more program constructs;

determining that at least one additional projection is to be displayed in addition to the first projection;

visually presenting a second projection that corresponds to and that is based on the same one or more artifacts rendered by the first projection, the second projection being presented simultaneously with at least a portion of the first projection, the second projection illustrating the one or more artifacts with a second set of one or more elements of the workflow, the first set of one or more elements having a different form of presentation than a form of presentation used for the second set of one or more elements even though the first set and second set of one or more elements correspond to the same one or more artifacts of the declarative program; and automatically updating the second set of one or more elements of the workflow according to edits performed in the first projection on the one or more artifacts of the declarative program, the edits being lossless such that no data is lost between the first projection and the second projection.

2. A computer system comprising the following:
one or more processors;
system memory;
one or more computer-readable storage media having stored thereon computer-executable instructions that are executable by the one or more processors and that cause the computing system to perform a method for presenting multiple projections of a declarative program, the method comprising the following:
   an act of establishing a declarative program that includes one or more artifacts comprising one or more program constructs;
   an act of visually presenting a first projection of the declarative program within an interface display, the first projection illustrating the one or more artifacts and including a first set of one or more elements of a workflow corresponding to the one or more program constructs;
   an act of determining that at least one additional projection is to be displayed in addition to the first projection;
   an act of visually presenting a second projection that corresponds to and that is based on the same one or more artifacts rendered by the first projection, the second projection being presented simultaneously with at least a portion of the first projection, the second projection illustrating the one or more artifacts with a second set of one or more elements of the workflow, the first set of one or more elements having a different form of presentation than a form of presentation used for the second set of one or more elements even though the first set and second set of one or more elements correspond to the same one or more artifacts of the declarative program; and
   an act of automatically updating the second set of one or more elements of the workflow according to edits performed in the first projection on the one or more artifacts of the declarative program, the edits being lossless such that no data is lost between the first projection and the second projection.

3. The computer system of claim 2, wherein the one or more artifacts comprise workflow activities, each workflow activity comprising one or more pulses of work.

4. The computer system of claim 3, wherein the workflow comprises a representation of a business activity.

5. The computer system of claim of 2, wherein the declarative program is executable in a continuation-based runtime.

6. The computer system of claim 2, wherein the declarative program comprises a long-running program.

7. The computer system of claim 2, wherein a computer system user specifies that the at least one additional projection is to be displayed in addition to the first projection, the at least one additional projection presenting a different level of detail and abstraction than the first projection.

8. The computer system of claim of claim 2, further comprising:
   an act of determining a computer system user's declarative program objectives; and
   an act of defining the second projection in accordance with the computer system user's determined objectives.

9. The computer system of claim 2, wherein the second projection is generated by the computer system as part of the declarative program, the second projection capable of being added or removed dynamically.

10. The computer system of claim 2, further comprising:
   an act of receiving a user input indicating an intent to switch from the first projection to the second projection; and
   an act of displaying the first projection over the second projection.

11. The computer system of claim 2, wherein one or more presentation images of the first and second projections are automatically updated with data from the one or more artifacts.

12. The computer system of claim 2, wherein the second projection comprises a text representation that is semantically equivalent to the artifact's data structure.

13. The computer system of claim 2, wherein the second projection is a partial projection that reflects a summary of information presented in the first projection.

14. The computer system of claim 13, further comprising an act of generating the partial projection for the identified form of the declarative program.

15. The computer system of claim 13, wherein the partial projection is provided by a third party.

16. The computer system of claim 13, further comprising showing one or more binding terminals that are currently available in the partial projection presentation.

17. The computer system of claim 13, wherein the partial projection presentation comprises an event-driven overlay, the event-driven overlay capable of being toggled on or off.

18. The computer system of claim 13, wherein the partial presentation comprises an outline view with one or more elements and one or more corresponding relationships between the elements.

19. The computer system of claim 2, wherein each element in the first set of one or more elements is self-documenting.

20. One or more hardware storage devices having stored thereon computer-executable instructions that are executable by one or more processors of a computer system to cause the computer system to present multiple projections of a declarative program by causing the computer system to:
   establish a declarative program that includes one or more artifacts comprising one or more program constructs;
   visually present a first projection of the declarative program within an interface display, the first projection illustrating the one or more artifacts and including a first set of one or more elements of a workflow corresponding to the one or more program constructs;
   determine that at least one additional projection is to be displayed in addition to the first projection;
   visually present a second projection that corresponds to and that is based on the same one or more artifacts rendered by the first projection, the second projection being presented simultaneously with at least a portion of the first projection, the second projection illustrating the one or more artifacts with a second set of one or more elements of the workflow, the first set of one or more elements having a different form of presentation than a form of presentation used for the second set of one or more elements even though the first set and second set of one or more elements correspond to the same one or more artifacts of the declarative program; and
   automatically update the second set of one or more elements of the workflow according to edits performed in the first projection on the one or more artifacts of the declarative program, the edits being lossless such that no data is lost between the first projection and the second projection.

* * * * *